(12) United States Patent
Schliwka et al.

(10) Patent No.: US 8,519,071 B2
(45) Date of Patent: Aug. 27, 2013

(54) LOW-VISCOSITY AQUEOUS COMPOSITIONS

(75) Inventors: Thomas Schliwka, Berisch Gladbach (DE); Ronald Klagge, Erkrath (DE); Uwe Held, Velbert (DE); Thomas Mausberg, Haan (DE)

(73) Assignee: Cognis IP Management GmbH, Duesseldorf (DE)

( * ) Notice: Subject to any disclaimer, the term of this patent is extended or adjusted under 35 U.S.C. 154(b) by 0 days.

(21) Appl. No.: 13/298,468

(22) Filed: Nov. 17, 2011

(65) Prior Publication Data

US 2012/0130035 A1     May 24, 2012

(30) Foreign Application Priority Data

Nov. 18, 2010   (EP) ..................................... 10191672

(51) Int. Cl.
*C08F 2/00* (2006.01)
*C08F 210/00* (2006.01)
*C08F 20/06* (2006.01)
*C08F 118/02* (2006.01)
*B01F 3/08* (2006.01)

(52) U.S. Cl.
USPC ........ 526/209; 526/348; 526/317.1; 526/319; 516/25

(58) Field of Classification Search
USPC ................. 526/209, 348, 317.1, 319; 516/25
See application file for complete search history.

(56) References Cited

FOREIGN PATENT DOCUMENTS

| CA | 2013920 | 10/1990 |
|----|---------|---------|
| EP | 0391392 | 10/1990 |
| EP | 1 318 157 A1 * | 6/2003 |
| EP | 1318157 | 6/2003 |
| EP | 2239276 | 10/2010 |

OTHER PUBLICATIONS

"European Search Report", Mar. 29, 2011, 4 pages.

* cited by examiner

*Primary Examiner* — William Cheung
(74) *Attorney, Agent, or Firm* — Servilla Whitney LLC

(57) ABSTRACT

Provided are low-viscosity aqueous compositions comprising compounds of Formula (III) and (IV). These compositions are prepared by jointly ethoxylating a mixture of the compounds of the Formula (I) and (II) to give an intermediate which represents a mixture of compounds of Formulas (I*) and (II*). The intermediate is then converted by sulfation or phosphation and subsequent neutralization, into an aqueous composition comprising the compounds of Formula (III) and (IV). The aqueous compositions are notable for having, at 20° C., a Brookfield viscosity of 3000 mPas or less (measured at 20° C. with spindle 2 and 20 rpm), and are suitable as emulsifiers for emulsion polymerization.

7 Claims, No Drawings

LOW-VISCOSITY AQUEOUS COMPOSITIONS

CROSS-REFERENCE TO RELATED APPLICATIONS

This application claims the benefit of priority under 35 U.S.C. §119(a) to European Patent application number 10191672.4, filed on Nov. 18, 2010, which is incorporated herein by reference in its entirety.

BACKGROUND

1. Technical Field

The invention is situated in the polymer sector and relates to low-viscosity aqueous compositions and also to the use thereof in emulsion polymerization.

2. Background Information

Fatty alcohol ether sulfates, which are anionic surfactants, exhibit the phenomenon, in aqueous solution at concentrations of about 30% by weight, of forming gel phases, this being associated with a considerable increase in viscosity. There occur here "gel blocks"; in other words, these systems take the form of solid gels. For numerous applications, this is undesirable; in particular, a concomitant of this gel phase is the fact that these aqueous fatty alcohol ether sulfates are no longer liquid and hence can no longer be easily managed.

SUMMARY

It was an object of the present invention to provide aqueous compositions which comprise a high proportion of fatty alcohol ether sulfates and are also liquid at 20° C. Liquid for the purposes of the present invention means that the aqueous compositions have a viscosity of 3000 mPas or less and more particularly 1000 mPas or less (Brookfield viscosity of the composition as measured at 20° C. with spindle 2 at 20 rpm).

DETAILED DESCRIPTION

A first subject of the invention are aqueous compositions having at 20° C. a Brookfield viscosity of 3000 mPas or less (measured at 20° C. with spindle 2 at 20 rpm) and comprising compounds of the general formula (III)

$$R-O-(EO)_p-X \qquad (III)$$

and compounds of the general formula (IV)

$$CH_2=CH-CH_2-O-(EO)_q-X \qquad (IV)$$

in which
R is an alkyl radical having 8 to 18 C atoms, which may be saturated or unsaturated, straight-chain or branched,
X is a sulfate or phosphate group, the sulfate or phosphate group X being in neutralized form,
(EO) is an ethylene oxide group,
p is a number in the range from 2 to 100, and
q is a number in the range from 2 to 100, with the proviso that the aqueous composition comprises the compounds (III) in an amount of at least 35% by weight, based on the overall composition, and with the further proviso that the aqueous composition comprises the sum of the compounds (III) and (IV) in an amount in the range from 35 to 70 percent by weight, based on the overall composition, these compositions being prepared by in a first step (i), jointly ethoxylating a mixture of the compounds of the general formula (I)

$$R-O-(EO)_n H \qquad (I)$$

and compounds of the general formula (II)

$$CH_2=CH-CH_2-O-(EO)_m-H \qquad (II)$$

in which
R is an alkyl radical having 8 to 18 C atoms, which may be saturated or unsaturated, straight-chain or branched,
(EO) is an ethylene oxide group,
n is a number in the range from 0 to 30, and
m is a number in the range from 0 to 30,
with the proviso that the compounds (I) are present in the mixture of the compounds (I) and (II) in a proportion of at least 60% by weight, based on the overall mixture (I) and (II), in such a way that the average degree of ethoxylation of the compounds (I) and (II) is raised by in each case at least two EO units per molecule, to give an intermediate (Z) which represents a mixture of the compounds of the general formula (I*)

$$R-O-(EO)_r H \qquad (I^*)$$

and compounds of the general formula (II*)

$$CH_2=CH-CH_2-O-(EO)_s-H \qquad (II^*)$$

in which
R is an alkyl radical having 8 to 18 C atoms, which may be saturated or unsaturated, straight-chain or branched,
(EO) is an ethylene oxide group,
r is a number in the range from 2 to 100, and
s is a number in the range from 2 to 100,
and then converting the intermediate (Z) obtained in step (i) in a second step (ii), by sulfation or phosphation and subsequent neutralization, into an aqueous composition comprising the compounds (III) and (IV).

The neutralization of the sulfate or phosphate groups produced in step (ii) may be accomplished, for example, with aqueous alkali metal hydroxides or alkaline earth metal hydroxides, such as sodium, potassium, calcium or magnesium hydroxide. Aqueous ammonia may also be used for the neutralization.

The compounds (I) and (II) may be prepared by any methods known to the skilled person, typically by reaction of the corresponding alcohol with ethylene oxide in the presence of an ethoxylation catalyst. This may be illustrated, using the compounds (II) as an example, by the following scheme:

$$CH_2=CH-CH_2-OH+m(EO) \rightarrow CH_2=CH-CH_2-O-(AO)_m-H$$

In line with the observation above, it is noted that the index m here is a (statistical) average; accordingly, for $CH_2=CH-CH_2-O-(AO)_m-H$, the indication "m=1" means that 1 mol of allyl 30 alcohol has been reacted with 1 mol of ethylene oxide; "m=2" means that 1 mol of allyl alcohol has been reacted with 2 mol of ethylene oxide; "m=6" means that 1 mol of allyl alcohol has been reacted with 6 mol of ethylene oxide, and so on. The index m therefore represents the molar reaction ratio of allyl alcohol and ethylene oxide employed, it being possible for the allyl alcohol ethoxylates to differ in their homolog distribution in accordance with the catalyst used.

The comments made here in respect of the compounds (II) also apply, entirely analogously, to the compounds (I).

A further subject of the invention is the use of the aforesaid compositions as emulsifiers in the emulsion polymerization of olefinically unsaturated monomers. It is possible here in principle to use all industrially significant, substantially water-insoluble monomers, but preferably (meth)acrylic compounds, styrenic compounds, and vinyl compounds.

Typical examples of these monomers are vinylaromatics, such as styrene, divinylbenzene or vinyltoluene, polymerizable olefins and diolefins such as propene, butadiene or isoprene, esters of acrylic or methacrylic acid with linear or branched alcohols having 1 to 18 carbon atoms, more particularly of alcohols having 1 to 8 carbon atoms, and, with particular preference, of methyl esters, ethyl esters, and butyl esters thereof, vinyl esters of acids having 2 to 12 carbon atoms, more particularly vinyl acetate, vinyl propionate, vinyl 2-ethylhexanoate, and vinyl laurate, vinyl alkyl ethers having alkyl groups with 1 to 8 carbon atoms, vinyl chloride, vinylidene chloride, and the like.

Monomers selected from the group consisting of alkyl acrylates, styrene acrylates, VeoVa compounds, and mixtures thereof, with or without addition of acrylic acid or methacrylic acid, are particularly preferred in the context of the present invention.

In the presence of the compositions of the invention, the monomers may be homopolymerized or copolymerized with other of the stated compounds from the recitation above.

It is also possible, furthermore, in the course of the emulsion polymerization, to use the compounds (III) and (IV) of the invention in combination with known nonionic and/or anionic co-emulsifiers. This may lead to dispersions with increased stability, with respect to shearing forces, temperature effects, and electrolytes, for example. The co-emulsifiers in such cases are added in amounts of 0.5% to 5%, preferably 1% to 3%, by weight, based on the entirety of the monomers used. It is possible in this case to introduce the co-emulsifiers together with the emulsifiers at the beginning of the polymerization, or to meter them in during the course of the polymerization. A further version envisions preparing a preliminary emulsion, using the co-emulsifiers alone or concomitantly, and metering in this preliminary emulsion in the course of the polymerization. It is also possible, in order subsequently to stabilize the dispersions obtained using the acrylic and/or methacrylic esters of the invention, to add co-emulsifiers to said dispersions.

The latices obtainable by emulsion polymerization through the use of the compositions of the invention can be employed in the coatings industry, for example.

EXAMPLES

Compounds Used

Disponil LS 10: adduct of 10 mol of ethylene oxide with 1 mol of a C12/12 alcohol (Cognis)
Breox AA E 450: adduct of 10 mol of ethylene oxide with 1 mol of allyl alcohol (Cognis)

Example 1

Preparation of Emulsifier

Step (i)=ethoxylation
649 g (1.0236 mol) of Disponil LS 10 and 661 g (1.46888 mol) of Breox AA E 450 were admixed with 2190 g (49.77 mol) of ethylene oxide (EO). The mixture was held in an autoclave at a temperature of 120-125° C. for 3 hours in the presence of 1.75 g of KOH(s) (catalyst). The resulting ethoxylation product (intermediate Z) was used in step (ii), described below.
Step (ii)=sulfation
608.4 g/h (0.4880 mol/h) of the ethoxylation product obtained in step (i) (intermediate Z) were esterified on the laboratory scale with 163.6 g/h (1.3293 mol/h) of oleum in a continuous sulfation procedure. The stated molar flow rate corresponds to a reaction ratio of 1 mol of alcohol ethoxylate to 1.15 mol of oleum. In order to generate a sufficient $SO_3$ stream, a nitrogen stream ($N_2$) of 720 liters/h was established. The temperature of the reactor during the sulfation was 70° C.; the raw materials were preheated to 60° C. The acidic ester obtained was stirred into an alkaline solution. The alkaline solution used was a mixture of 55 g of NaOH (50% strength) and 301.2 g of water. All in all, a total amount of 972.6 g of acidic ester was stirred into the alkaline solution. This gave, by calculation, a mass fraction of neutralized ester (soap) of 75.3% by weight (the mass fraction refers to the amount of acidic ester R—$SO_3$H neutralized by means of the alkali solution to give R—$SO_3$Na. This indicates the total dry residue and is a calculated value which is in good agreement with the analytically determined value of the "dry residue 4 h/105° C." (see table). The calculation was as follows:

NaOH: 55 g/acidic ester: 972.6 g/$H_2O$: 301.2 g/sum (total mass)=1328.8 g mass of soap=972.6+(55*0.5) g=1000.1 g mass fraction of soap in % by weight=mass of soap/total mass=1000.1 g*100/1328.8 g).

This was followed by a filtration. The key data for the anionic surfactant obtained are given in the table below:

| | |
|---|---|
| Epton titration | 4.2% |
| Dry residue in the oven, 4 hours at 105° C. | 75.8% by weight |
| Sodium sulfate (dithizone method) | 0.12% by weight |
| pH 10% | 7.0-9.5 |
| Kaufmann iodine number | 6.52 |
| Unsulfated fractions | 9.0% by weight |
| Viscosity (Brookfield @ 24° C.) | 690 mPas |

The anionic surfactant prepared in example 1 was employed in the use examples described below (examples 2 and 3).

USE EXAMPLES

The examples below demonstrate the use of the emulsifier from example 1 in emulsion polymerization. Different monomer systems were used, as follows:
styrene-acrylate (S-Ac)
vinyl acetate-butyl acrylate (Vac-BA)
VeoVa9/10 acrylate (VeoVa-Ac)

Example 2

2.5 g of potassium peroxodisulfate were dissolved in 97.5 g of water. This solution was used as the reactor solution. The monomers, 235 g of styrene, 235 g of butyl acrylate, and 7.5 g of methacrylic acid, were mixed and then stirred into a solution of 22.3 g of the emulsifier prepared as per example 1 (anionic surfactant content 56%), 277.7 g of water, 7.5 g of acrylamide and 15.0 g of methylolacrylamide. This solution was termed the preliminary emulsion. In addition, a solution of 2.5 g of sodium bisulfite and 97.5 g of water was weighed in, this being referred to as the initiator solution.
Procedure:
The construction of the reactor was such that the stirrer did not scrape the glass walls. The reactor solution was prepared in a glass beaker and transferred to the reactor. Then 150 ml of the preliminary emulsion were added and the entire apparatus was flushed with nitrogen for 15 minutes. The nitrogen stream was maintained throughout the experiment. The thermostat was brought to a temperature of 63° C. At 60° C., 5 ml of the initiator solution were introduced dropwise into the reactor in order to initiate the reaction. When the temperature had risen to 63° C., the continuous metered feed was commenced. The metering time was 150 minutes. After the end of metering, polymerization was continued for a further 60 minutes at a temperature raised by 3° C. After the end of reaction, the contents were cooled to <30° C. and adjusted to a pH in the 8.0-9.0 range using 3.7 g of ammonia (w=0.125). The dispersion was filtered through a tared filter bag into a 1000 ml glass vessel with screw-top lid. The filter was washed thoroughly with distilled water, and the mass of free coagulum was determined after 24-hour drying at 50° C. The polymer dispersion obtained had a solids content of 49.5%. The coagulum fraction was 0.31%. The particle size was 194 nm, and the viscosity was 690 mPas.

Example 3

1.17 g of potassium peroxodisulfate were dissolved in 150 g of water. This solution was used as the reactor solution. The monomers, 370.9 g of vinyl acetate, 157.4 g of butyl acrylate, and 5.3 g of acrylic acid, were mixed and then stirred into a solution of 19 g of the emulsifier prepared as per example 1 (anionic surfactant content 56%), 296.1 g of water, and 0.5 g of borax. This solution was termed the preliminary emulsion.
Procedure:
The construction of the reactor was such that the stirrer did not scrape the glass walls. The initial reactor charge was prepared in a glass beaker and transferred to the reactor. 90 ml of the preliminary emulsion were introduced into the reactor. Then the entire apparatus was flushed with nitrogen for 15 minutes. The nitrogen stream was maintained throughout the experiment. The thermostat was brought to a temperature of 73° C. At 70° C., the continuous metered feed was commenced. The metering time was 200 minutes and the temperature was held in the range of 70-75° C. After the end of metering, polymerization was continued for a further 30 minutes at 75° C. After the end of reaction, the contents were cooled to <40° C. and adjusted to a pH in the 7.0-8.0 range using 12 g of ammonia (w=0.125). The polymer dispersion obtained had a solids content of 53.8%. The coagulum fraction was 1.65%. The particle size was 241 nm, and the viscosity was 250 mPas.

Example 4

0.47 g of potassium peroxodisulfate and 8.43 g of the emulsifier prepared as per example 1 (anionic surfactant content 56%) were dissolved in 253.69 g of water. This solution was used as the reactor solution. The monomers, 142 g of VeoVa10, 71 g of VeoVa9, 151.5 g of methyl acrylate, 94.7 g of butyl acrylate, and 14.2 g of acrylic acid, were mixed and then stirred into a solution of 8.43 g of the emulsifier prepared as per example 1 (anionic surfactant content 56%), 253.7 g of water, and 1.8 g of potassium peroxodisulfate. This solution was termed the preliminary emulsion.
Procedure:
The initial reactor charge was prepared in a 250 ml glass beaker and transferred to the reactor. 20 ml of the preliminary emulsion were introduced into the reactor. The entire apparatus was then flushed with nitrogen for 15 minutes. The nitrogen stream was maintained throughout the experiment. Without circulation, the thermostat was heated to a temperature of 85° C. The initial reactor charge was introduced, the preliminary emulsion was prepared (first water, then monomer), followed by pumping in circulation and, after five minutes, by the tapped removal of 20 ml. The reactor was heated to 80° C. and the 20 ml withdrawn by tapping were supplied at a reactor temperature of 80° C. After five minutes, the reaction temperature rose to a maximum of about 84° C. The continuous metered feed was then commenced, and extended over 180 minutes. This was followed by subsequent polymerization for 60 minutes. After the end of reaction, the contents were cooled to <40° C. and a pH in the 7.0-9.0 range was set with 10 g of ammonia (w=0.125). The resulting polymer dispersion had a solids content of 48%. The coagulum fraction was 0.5%. The particle size was 168 nm, and the viscosity was 1950 mPas.

What is claimed is:

1. An aqueous composition having at 20° C. a Brookfield viscosity of 3000 mPas or less (measured at 20° C. with spindle 2 at 20 rpm) and comprising compounds of the general formula (III)

$$R\text{—}O\text{-}(EO)_p X \tag{III}$$

and compounds of the general formula (IV)

$$CH_2\text{=}CH\text{—}CH_2\text{—}O\text{-}(EO)_q\text{—}X \tag{IV}$$

wherein
R is an alkyl radical having 8 to 18 C atoms, which may be saturated or unsaturated, straight-chain or branched,
X is a sulfate or phosphate group, the sulfate or phosphate group X being in neutralized form,
(EO) is an ethylene oxide group,
p is a number in the range from 2 to 100, and
q is a number in the range from 2 to 100,
with the proviso that the aqueous composition comprises the compounds (III) in an amount of at least 35% by weight, based on the overall composition, and with the further proviso that the aqueous composition comprises the sum of the compounds (III) and (IV) in an amount in the range from 35 to 70 percent by weight, based on the overall composition,
wherein the composition is prepared by:
(i) jointly ethoxylating a mixture of the compounds of the general formula (I)

$$R\text{—}O\text{-}(EO)_n H \tag{I}$$

and compounds of the general formula (II)

$$CH_2\text{=}CH\text{—}CH_2\text{—}O\text{-}(EO)_m\text{—}H \tag{II}$$

wherein
R is an alkyl radical having 8 to 18 C atoms, which may be saturated or unsaturated, straight-chain or branched,
(EO) is an ethylene oxide group,
n is a number in the range from 0 to 30, and
m is a number in the range from 0 to 30,
with the proviso that the compounds (I) are present in the mixture of the compounds (I) and (II) in a proportion of at least 60% by weight, based on the overall mixture (I) and (II), in such a way that the average degree of ethoxylation of the compounds (I) and (II) is raised by in each case at least two EO units per molecule,
to give an intermediate (Z) which represents a mixture of the compounds of the general formula (I*)

$$R\text{—}O\text{-}(EO)_r H \tag{I*}$$

and compounds of the general formula (II*)

$$CH_2\text{=}CH\text{—}CH_2\text{—}O\text{-}(EO)_s\text{—}H \tag{II*}$$

wherein
R is an alkyl radical having 8 to 18 C atoms, which may be saturated or unsaturated, straight-chain or branched,
(EO) is an ethylene oxide group,
r is a number in the range from 2 to 100, and s is a number in the range from 2 to 100, (ii) and then converting the intermediate (Z) by sulfation or phosphation and subsequent neutralization, into an aqueous composition comprising the compounds (III) and (IV).

2. A method of polymerizing olefinically unsaturated monomers, the method comprising using the composition of claim 1 as an emulsifier in a polymerization reaction.

3. The method of claim 2, wherein the olefinically unsaturated monomers are selected from vinylaromatics, polymerizable olefins and diolefins, esters of acrylic or methacrylic acid with linear or branched alcohols having 1 to 18 carbon atoms, vinyl esters of acids having 2 to 12 carbon atoms, vinyl alkyl ethers having alkyl groups with 1 to 8 carbon atoms, alkyl acrylates, styrene acrylates, VeoVa compounds.

4. The method of claim 2, wherein the olefinically unsaturated monomers are homopolymerized or copolymerized.

5. The method of claim 2, wherein the olefinically unsaturated monomers are selected from alkyl acrylates, styrene acrylates, VeoVa compounds, and mixtures thereof, with or without the addition of acrylic acid or methacrylic acid.

6. The method of claim 2, wherein the composition of claim 1 is used in combination with a nonionic and/or anionic co-emulsifier.

7. The method of claim 6, wherein the co-emulsifier is added in amount of 0.5% to 5%, by weight based on the entirety of the monomers used.

* * * * *